United States Patent
Rhoden et al.

(10) Patent No.: US 12,345,210 B2
(45) Date of Patent: Jul. 1, 2025

(54) HIGH ACCURACY FUEL SYSTEM

(71) Applicant: Hamilton Sundstrand Corporation, Charlotte, NC (US)

(72) Inventors: William E. Rhoden, Mesquite, NV (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/375,044

(22) Filed: Sep. 29, 2023

(65) Prior Publication Data

US 2024/0018911 A1    Jan. 18, 2024

Related U.S. Application Data

(62) Division of application No. 16/820,565, filed on Mar. 16, 2020, now abandoned.

(51) Int. Cl.
| | |
|---|---|
| *F02C 9/26* | (2006.01) |
| *F02C 7/232* | (2006.01) |
| *F02C 9/28* | (2006.01) |
| *G01F 1/86* | (2006.01) |

(52) U.S. Cl.
CPC .............. *F02C 9/263* (2013.01); *F02C 7/232* (2013.01); *F02C 9/28* (2013.01); *G01F 1/86* (2013.01); *F05D 2220/32* (2013.01); *F05D 2270/01* (2013.01); *F05D 2270/301* (2013.01); *F05D 2270/303* (2013.01); *F05D 2270/306* (2013.01)

(58) Field of Classification Search
CPC .. F02C 7/232; F02C 9/263; F02C 9/28; G01F 1/86
See application file for complete search history.

(56) References Cited

U.S. PATENT DOCUMENTS

| | | |
|---|---|---|
| 6,148,601 A | 11/2000 | Jones et al. |
| 9,228,525 B2 | 1/2016 | Nistler et al. |
| 2005/0016176 A1 | 1/2005 | Griffiths et al. |

(Continued)

FOREIGN PATENT DOCUMENTS

| | | |
|---|---|---|
| CN | 110067652 A | 7/2019 |
| FR | 3053396 A1 | 1/2018 |

OTHER PUBLICATIONS

Extended European search report issued in corresponding EP applicaton No. 21162951.4, dated Aug. 11, 2021.

(Continued)

*Primary Examiner* — Scott J Walthour
(74) *Attorney, Agent, or Firm* — Kinney & Lange, P.A.

(57) ABSTRACT

In accordance with at least one aspect of this disclosure, a fuel system can include, a fuel device, a fuel characterization device operatively connected to the fuel device configured to measure performance data of the fuel device before installation into an engine fuel system, and an electronic engine controller operatively connected to the fuel characterization device to receive the measured performance data of the fuel device on start up and calculate a metered mass flow based at least in part on the measured performance data of the fuel device. The electronic engine controller can be configured to control the fuel device to direct, meter, or pump fuel to the engine through the fuel device based on the calculated metered mass flow.

17 Claims, 2 Drawing Sheets

(56) References Cited

U.S. PATENT DOCUMENTS

| | | | |
|---|---|---|---|
| 2006/0130455 A1* | 6/2006 | Griffiths | F23R 3/343 |
| | | | 60/39.281 |
| 2012/0042657 A1 | 2/2012 | Hodinot et al. | |
| 2013/0269364 A1* | 10/2013 | Romig | F02C 7/232 |
| | | | 60/779 |
| 2016/0053691 A1 | 2/2016 | Ernst | |
| 2017/0338665 A1* | 11/2017 | Long | H02J 7/0013 |
| 2018/0322714 A1* | 11/2018 | Gennotte | G07C 5/0808 |
| 2019/0362115 A1 | 11/2019 | Reuter et al. | |
| 2022/0003173 A1* | 1/2022 | Joudareff | F02C 7/232 |

OTHER PUBLICATIONS

Communication Pursuant to Article 94(3) EPC dated Oct. 9, 2024, for corresponding European Patent Application No. 21162951.4, 5 pgs.

* cited by examiner

HIGH ACCURACY FUEL SYSTEM

CROSS-REFERENCE TO RELATED APPLICATIONS

This application is a divisional of U.S. patent application Ser. No. 16/820,565, filed Mar. 16, 2020, the entire content of which is incorporated by reference herein.

BACKGROUND

Technological Field

This disclosure relates to a fuel system, and particularly to an improvement of the calibration and metering flow accuracy of the fuel system.

Description of Related Art

A gas turbine engine's performance heavily depends on the ability of a fuel system to meter flow accurately. Fuel system mass flow accuracy depends on the difference between calculated flow and actual metered flow.

The nominal relationship of a device's metering valve position to mass flow is stored on Electronic Engine Controller (EEC). System accuracy thus depends on the metering valve position sensor accuracy, metering window manufacturing tolerances, the accuracy of the pressure regulating valve and uncertainty of specific gravity of the fuel. Today's typical fuel system accuracies generally fall in the 3-6% range, causing uncertainty in the actual fuel delivered to the engine. Uncertainty results in engines being operated at less than optimal performance.

Typical systems also require a mechanical calibration of each individual pump, sensor or metering valve, which meter flow based on mechanical position, as opposed to actual flow. Although the conventional methods and systems have generally been considered satisfactory for their intended purpose, a means of improving metered flow accuracy across the fuel system is desired. There also remains a need in the art for such metering and components that are economically viable. The present disclosure provides an improvement with respect to at least these challenges.

SUMMARY OF THE INVENTION

A fuel device includes a housing including at least one fuel channel configured to accept or pass fuel there through, and a characterization device coupled to the housing including a memory chip, wherein the memory chip includes measured performance data of the at least one fuel channel. The at least one fuel channel can include a metering valve or a pressure regulating valve or a pump or a sensor. The fuel device can be for example a fuel metering unit, a fuel pump, a densimeter and a flow divider valve.

The characterization device can include a communication device configured to passing measured performance data to an electronic engine controller. The measured performance data can include a plurality of fuel pressure, fuel density, fuel temperature conditions. The measured performance data can also include internal fuel leakage rates.

A fuel system includes at least one fuel device for directing, metering, sensing or pumping fuel as part of a gas turbine engine, comprising a characterization device configured to store measured performance data of the device and communicate the performance data to an electronic engine controller, and an electronic engine controller coupled to the at least one fuel device configured to control the at least one fuel device. The characterization device can be in wired or wireless communication with the electronic engine controller. The at least one fuel device can be a fuel pump or, a fuel metering unit, densimeter, or a flow divider valve.

A method of metering fuel by a fuel system can include calculating mass fuel flow—based on an equation mass fuel flow=K*CdA*√(dP*S) where K is a constant, CdA is a metering area (orifice area), dP is a pressure drop across the orifice, and S is a specific gravity of the fuel, storing a plurality of mass fuel flow conditions for the fuel device at plurality of metering areas, fuel temperatures, and fuel densities on a memory device of the characterization device, installing the fuel device within a fuel system, identifying the fuel device to an electronic engine controller, transferring fuel device performance data to the electronic engine controller and metering flow through the fuel device by the electronic engine controller based on the stored mass fuel flow data. The electronic engine controller can also aggregate characterization data from multiple fuel devices. The method allows for replacing at least one fuel device with a second fuel device, identifying the second fuel device to an electronic engine controller, transferring fuel device mass fuel flow data of the second fuel device to the electronic engine controller, metering flow through the second fuel device by the electronic engine controller based on the stored mass fuel flow data.

In accordance with at least one aspect of this disclosure, a fuel system can include, a fuel device, a fuel characterization device operatively connected to the fuel device configured to measure performance data of the fuel device before installation into an engine fuel system, and an electronic engine controller operatively connected to the fuel characterization device to receive the measured performance data of the fuel device on start up and calculate a metered mass flow based at least in part on the measured performance data of the fuel device. The electronic engine controller can be operatively connected to the fuel device to control the fuel device to direct, meter, or pump fuel to the engine through the fuel device based on the calculated metered mass flow.

In embodiments, the fuel characterization device further includes a memory, and the fuel characterization device can be configured to store the measured performance data in the memory, e.g., before installation into the fuel system.

In embodiments, the fuel device can further include a housing having at least one fuel channel configured to direct, meter, sense or pump fuel therethrough, and the fuel characterization device can be operatively coupled to the housing. In certain embodiments, the at least one fuel channel can include a metering valve and/or a pressure regulating valve.

In embodiments, the measured performance data can include one or more of: a fuel pressure, a fuel density, and/or a fuel temperature of the fuel within the at least one fuel channel. In embodiments, the measured performance data can also include a fuel leakage rate of fuel from the housing.

In certain embodiments, the fuel characterization device can be configured to wirelessly communicate with the electronic engine controller, and in embodiments, the wireless communication can include a quick response code.

In certain embodiments, the fuel characterization device can be configured to physically connect to the electronic engine controller, for example via a physical cable having a data storage unit for inserting into the electronic engine controller.

In embodiments, the fuel device can include a fuel pump, a fuel metering unit, a flow divider valve, or a densimeter. a fuel pump, a fuel metering unit, a flow divider valve, or a densimeter In certain embodiments, the fuel system can include a plurality of fuel devices, for example, all of a fuel pump, a fuel metering unit, a flow divider valve, and a densimeter. In certain such embodiments, each fuel device can include a respective fuel characterization device configured to measure performance data for the respective fuel device, The electronic engine controller operatively can be connected to each of the fuel characterization devices to receive the respective measured performance data of each fuel device and calculate a metered mass flow based at least in part on an aggregate of the measured performance data of the plurality of fuel devices. Further, the electronic engine controller can be configured to control each of the fuel devices to direct, meter, or pump fuel to the engine through the plurality of fuel devices based on the calculated metered mass flow.

In certain embodiments, the electronic engine controller can include computer readable instructions configured to cause the electronic engine controller to perform a method, the method comprising, identifying the fuel device, receiving the actual fuel device performance data from the fuel characterization device, calculating the metered mass flow based on the actual fuel device performance data, and controlling the fuel device to provide fuel to the engine based on the calculated metered mass flow.

In embodiments, the fuel device can include a fuel metering unit, and the calculated metered mass flow can be based at least in part on, a metering area or orifice area of the fuel metering unit, a pressure drop across the orifice or metering area of the fuel metering unit, and/or a specific gravity of fuel within the fuel metering unit.

In embodiments, the system can include a plurality of fuel flow devices, each fuel flow device having an individual respective fuel characterization device operatively coupled thereto. In such embodiments, the method performed by the controller can further include receiving the fuel device performance data for each respective fuel device to the electronic engine controller, aggregating the actual fuel device performance data for all fuel devices of the plurality of fuel devices, calculating the metered mass flow based on the aggregate measured fuel device performance data, and controlling the plurality of fuel device to provide fuel to the engine based on the aggregate actual fuel device performance data.

In accordance with at least one aspect of this disclosure, a fuel system can include, a fuel device suitable for a gas turbine engine. The fuel device can include a housing having at least one fuel channel configured to direct, meter, sense or pump fuel therethrough, and a characterization device coupled to the housing. The characterization device can include a memory chip, and the memory chip can include measured performance data of the at least one fuel channel, The characterization device can also include a communication device configured to pass the measured performance data to an electronic engine controller, and, in embodiments, the measured performance data can include fuel leakage rates from the fuel device housing. The fuel system can also include an electronic engine controller operatively connected to the fuel device configured to calculate a mass flow of the fuel device using the measured performance data and control the at least one fuel device based on the calculated mass flow.

In accordance with at least one aspect of this disclosure, a method of metering fuel by the fuel system described herein above, can include, measuring fuel performance data of the fuel device, storing the measured performance data of the fuel device on a memory device within the characterization device corresponding to the fuel device, installing the fuel device and characterization device within the fuel system, identifying the fuel device to the electronic engine controller, transferring fuel device measured performance data from the fuel characterization device to the electronic engine controller, calculating mass flow of the fuel device based on the measured performance data of the fuel device and based on a metering area or orifice area, a pressure drop across the orifice or metering area, and a specific gravity of fuel, and metering flow through the fuel device by the electronic engine controller based on the calculated mass flow of the fuel device. In embodiments, the fuel device performance data can include fuel leakage rates from a housing of the fuel device.

In embodiments, the method can further include, replacing the fuel device with a second fuel device, measuring fuel performance data of the second fuel device, storing the measured performance data of the second fuel device on a memory device within a second characterization device corresponding to the second fuel device, installing the second fuel device and second characterization device within the fuel system, identifying the second fuel device to the electronic engine controller, transferring performance data of the second fuel device to the electronic engine controller, calculating a mass flow of the second fuel device based on the measured performance data of the second fuel device, and metering flow through the second fuel device by the electronic engine controller based on the calculated mass flow for the second fuel device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
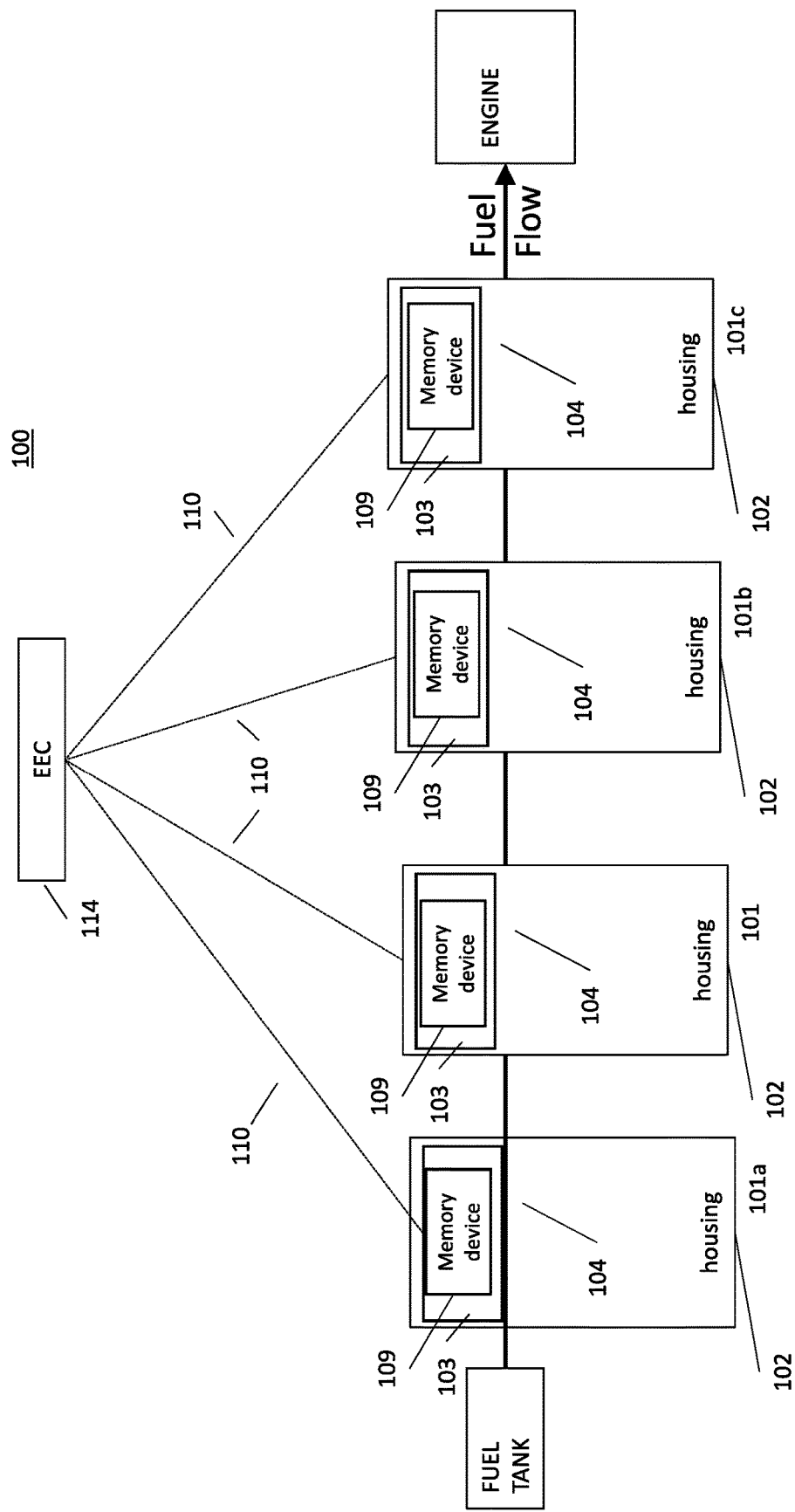
FIG. 1 is a schematic view of a fuel system according to an embodiment of the disclosure.
Figure 2:
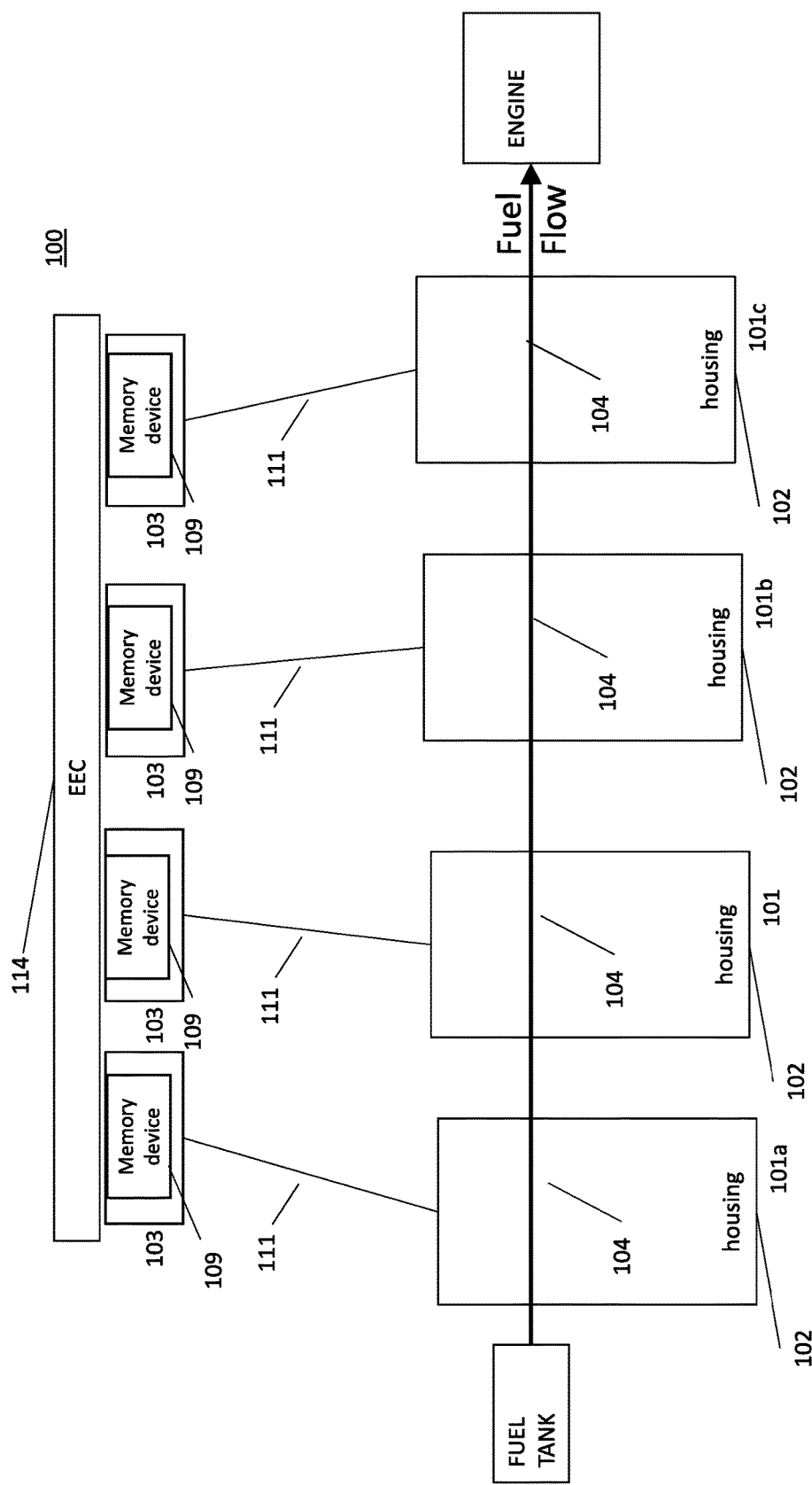
FIG. 2 is a schematic view of a second embodiment of the fuel system according to an embodiment of the disclosure.

Reference will now be made to the drawings wherein like reference numerals identify similar structural features or aspects of the subject invention. For purposes of explanation and illustration, and not limitation, a partial view of an exemplary embodiment of a fuel system in accordance with the invention are shown in FIGS. 1 and 2, and are designated generally by reference character 100. The methods and systems of the invention can be used to improve fuel metering accuracy, by adding characterization devices to various fuel system components that contribute to an EEC's calculation of mass flow.

A fuel system's calculated flow is dependent on the data an Electronic Engine Controller (EEC) receives regarding the expectant conditions of the fuel and ambient conditions. The calculation of flow is a function of the pressure drop across an orifice of a device and the effective orifice area and density of the fuel flowing within or through that device. Specifically the expectant flow is calculated based on an orifice equation which is expressed as Wf (pph) =K*CdA*Sqrt (dP*S) where Wf is weight flow, where K is a constant, CdA is the effective orifice area, which consists of the geometric area (A) times the discharge coefficient (Cd), dP is the pressure drop across the orifice and S is the specific gravity of the fluid being metered.

FIG. 1 shows a schematic of fuel system 100. The fuel system 100 includes at least one fuel device 101, such as a fuel pump (101a), a fuel metering unit (101), a densimeter (101b), or a divider valve (101c). The fuel device 101 includes a housing 102 having at least one fuel channel therein 104. Each fuel device 101 within fuel system 100 includes a characterization device 103 having a memory device 109 therein for storing performance characteristics of the given fuel device 101 and passing them to the EEC 114. The characterization device 103 is used to improve the accuracy of the inputs (dP, CdA, density) into the calculation of fuel flow so that the difference between calculated and actual mass flow is reduced. The memory device 109 contains a variety of data depending on what the fuel device 101 is. For example if the fuel device 101 is an metering unit the memory device 109 will at least contain the relationship of metered flow to some output such as measured valve position By using a characterization device 103, the actual performance characteristics of each specific fuel device 101 are mapped and stored the memory device 109 during production and passed on the EEC 114 during installation of the fuel device 101 into the fuel system 100, instead of the EEC 114 using expected or nominal performance characteristics of a default device.

The performance characteristics of each fuel device 101 are measured on a test rig and stored on the memory device 109 prior to the installation of the fuel device 101 within fuel system 100. The characteristics that are measured can include performance maps at various fuel temperatures, fuel densities, and fuel pressures. Further, if for instance, the fuel device is a fuel metering unit (FMU), which includes typically various valves, the valves can be run through various positions so that the performance of each particular configuration associated with varying flight conditions can be mapped and recorded on the memory device 109. Also internal leakage and the effects of internal leakage at various pressures and configurations can be recorded and mapped during testing. Previously, systems depended on a mechanical calibration of each individual fuel device such as a pump, fuel metering device, flow divider valve, densimeter or flow divider valve. Calculated metered flow was based on the nominal characteristics of these devices, as opposed their actual performance, and thus introduced errors in the calculation of fuel flow.

A data connection 110 allows characterization data to be read by EEC 114 from each characterization device 103 at installation. The data connection 110 to the EEC 114 can include multiple methods such as a serial link, such as an SPI bus, Quick Response code (QR) that get scanned and downloaded to the EEC 114 at installation, or other wireless communication. It is also considered that a physical cable with a DSU (data storage unit) plug that contains the memory device and gets inserted into the EEC 114 when the characterization device 103 is installed (as shown in FIG. 2). In this configuration the characterization device 103 plugs into the EEC so that it can be installed in the more friendly (i.e. less vibration, cooler) environment of the EEC 114. The characterization device is then connected by a lanyard 111 to the fuel device 101. Further if a fuel device 101 has to be replaced, the EEC 114 would read the particular characteristics of the new fuel device being installed and quickly be able to recalibrate the required performance.

The EEC 114 reads various performance characteristics of each fuel device at startup of an engine and stores said performance characteristics for use in the calculation of fuel flow. For instance, with a characterization device 103 on the FMU, the actual characteristic for each FMU or its components can be mapped. This greatly reduces sources of variation that are specific to the each fuel device 101 such as feedback device inaccuracy, metering window tolerances, and other characteristics. Further considering FMUs, regulation pressure (dP) of a pressure regulating valve (PRV) can be a function of the pressures that interface with it, the flow that the pressure regulating valve is bypassing (in the case of a positive displacement pump), the flow that it is throttling (in the case of a centrifugal pump), and fuel temperature. When a characterization device 103 is added to an FMU, and the characteristics are mapped at installation, the EEC 114 will know the specific characterization of the specific FMU in the fuel system (rather than assuming a nominal characteristic) and will therefore more accurately control the FMU. In the FMU the characterization device 103 will store the relationship between CdA and an output to the EEC (typically a sensor that is measuring metering valve position). This relationship can be mapped at a plurality of conditions of temperature, pressures, etc. Since dP is typically regulated by a regulator in the fuel metering unit, the regulator performance can also be mapped. The regulator performance (dP) depends on its input conditions, for example it may be a function of pump flow and pressures that it interfaces with and leakage flows. If these are known more accurately, then dP can be more accurately determined in the calculation of mass flow. Furthermore the parameters that interface with the pressure regulating valve such as flows, pressures and temperature may be received from other fuel devices such as pumps, flow divider valve and densimeter and these will be more accurately known due to their individual characterization devices.

The methods and systems of the present disclosure, as described above and shown in the drawings, provide for a fuel metering with increased accuracy. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of metering fuel by a fuel system, the method comprising the steps of:
measuring performance data of each respective fuel device of a plurality of fuel devices before installation of the plurality of fuel devices into the fuel system, wherein each fuel device of the plurality of fuel devices comprises at least one fuel channel;
storing the performance data of the plurality of fuel devices on a plurality of characterization devices, wherein each characterization device of the plurality of characterization devices is assigned to a respective fuel device of the plurality of fuel devices, and wherein each characterization device comprises a memory chip storing the performance data corresponding to the respective fuel device;
installing the plurality of fuel devices and the plurality of characterization devices within the fuel system;
identifying each fuel device of the plurality of fuel devices to an electronic engine controller;
transferring the performance data from the plurality of fuel characterization devices to the electronic engine controller;
calculating mass flow through the plurality of fuel devices based at least in part on an aggregate of the performance data of the plurality of fuel devices, a metering area or orifice area of the at least one fuel channel of each fuel device of the plurality of fuel devices, a pressure drop across the orifice area or metering area of the at least one fuel channel of each fuel device of the plurality of fuel devices, and a specific gravity of fuel; and
metering flow through the plurality of fuel devices by the electronic engine controller based on the calculated mass flow through the plurality of fuel devices.

2. The method of claim 1, further comprising:
replacing a first fuel device of the plurality of fuel devices installed in the fuel system with a second fuel device;
measuring performance data of the second fuel device before installing the second fuel device into the fuel system;
storing the performance data of the second fuel device on a second memory chip within a second characterization device corresponding to the second fuel device;
installing the second fuel device and the second characterization device within the fuel system;
identifying the second fuel device to the electronic engine controller; and
transferring the performance data of the second fuel device to the electronic engine controller.

3. A fuel system, comprising:
a plurality of fuel devices;
a plurality of fuel characterization devices, wherein each fuel characterization device of the plurality of fuel characterization devises is operatively connected to a respective fuel device of the plurality of fuel devices and comprises performance data of the respective fuel device measured and stored in memory on the respective fuel characterization device before installation of the respective fuel device into the fuel system; and
an electronic engine controller operatively connected to each fuel characterization device of the plurality of fuel characterization devices and configured to receive the performance data of each fuel device of the plurality of fuel devices on start up of the fuel system and calculate a metered mass flow based at least in part on an aggregate of the performance data of the plurality of fuel devices, and wherein the electronic engine controller is operatively connected to the plurality of fuel devices and configured to control the plurality of fuel devices to direct, meter, or pump fuel to an engine through the plurality of fuel devices based on the calculated metered mass flow.

4. The fuel system of claim 1, wherein each fuel device of the plurality of fuel devices further includes a housing having at least one fuel channel configured to direct, meter, sense or pump fuel therethrough, and wherein each fuel characterization device of the plurality of fuel characterization devices is operatively coupled to the housing of the respective fuel device.

5. The fuel system of claim 4, wherein the at least one fuel channel includes a metering valve.

6. The fuel system of claim 4, wherein the at least one fuel channel includes a pressure regulating valve.

7. The fuel system of claim 4, wherein the performance data includes one or more of: a fuel pressure, a fuel density, and/or a fuel temperature of the fuel within the at least one fuel channel.

8. The fuel system of claim 4, wherein the performance data includes a fuel leakage rate of fuel from the housing measured before installation into the fuel system.

9. The fuel system of claim 1, wherein the plurality of fuel characterization devices is configured to wirelessly communicate with the electronic engine controller.

10. The fuel system of claim 9, wherein the wireless communication includes a quick response code.

11. The fuel system of claim 1, wherein the plurality of fuel characterization devices is configured to physically connect to the electronic engine controller.

12. The fuel system of claim 11, wherein each fuel characterization device of the plurality of fuel characterization devices is configured to physically connect to the electronic engine controller via a physical cable having a data storage unit for inserting into the electronic engine controller.

13. The fuel system of claim 1, wherein the plurality of fuel devices includes a fuel pump, a fuel metering unit, a flow divider valve, or a densimeter.

14. The fuel system of claim 1, wherein the engine is a gas turbine engine, and the electronic engine controller is a gas turbine electronic engine controller.

15. The fuel system of claim 3, further comprising a lanyard coupling a first fuel characterization device of the plurality of fuel characterization devices to a first fuel device of the plurality of fuel devices.

16. A method of operating the fuel system of claim 1, wherein the electronic engine controller performs steps comprising:
identifying the plurality of fuel devices;
receiving the performance data from the plurality of fuel characterization devices;
calculating the metered mass flow based on the aggregate of the performance data; and
controlling the plurality of fuel devices to provide fuel to the engine based on the calculated metered mass flow.

17. The method of claim 16, wherein the plurality of fuel devices include a fuel metering unit, and wherein the calculated metered mass flow is based at least in part on, a metering area or orifice area of the fuel metering unit, a pressure drop across the orifice or metering area of the fuel metering unit, and/or a specific gravity of fuel within the fuel metering unit.

* * * * *